C. H. MORSE & M. SHOLES.
Blacking-Box.
No. 208,031.   Patented Sept. 17, 1878.
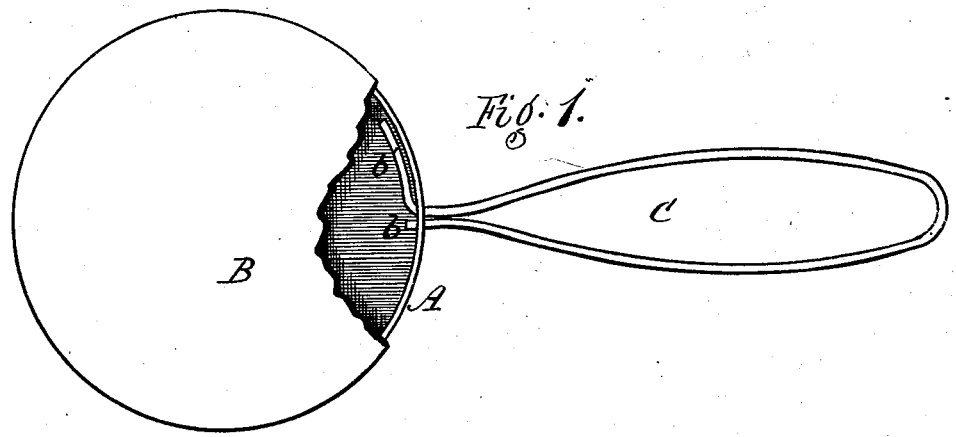
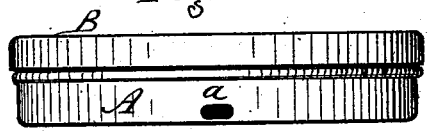   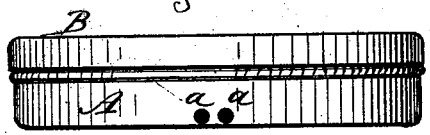
Attest.
R. E. White
Louis O'Jahn.
Inventors.
Chas. H. Morse,
Marion Sholes,
Per R. F. Osgood,
Atty.

UNITED STATES PATENT OFFICE.

CHARLES H. MORSE, OF ROCHESTER, AND MARION SHOLES, OF BROCKPORT, NEW YORK.

IMPROVEMENT IN BLACKING-BOXES.

Specification forming part of Letters Patent No. 208,031, dated September 17, 1878; application filed February 26, 1878.

*To all whom it may concern:*

Be it known that we, CHARLES H. MORSE, of the city of Rochester, in the county of Monroe and State of New York, and MARION SHOLES, of Brockport, in the county and State aforesaid, have invented a certain new and useful Improvement in Blacking-Boxes; and we do hereby declare that the following is a full, clear, and exact description of the same, reference being had to the accompanying drawings, in which—

Figure 1 is a plan of the blacking-box, with a portion of the cover broken away to show the interior arrangement. Fig. 2 is a vertical section of the same. Figs. 3 and 4 are elevations of the box, showing the holes through which the wire shank of the handle passes. Fig. 5 is a perspective view of the wire shank.

Our improvement relates to blacking-boxes having handles. Such boxes are well known.

The invention consists of a box constructed with a hole or holes in its side, and a handle having its end passing through said hole or holes, and soldered or otherwise fastened on the inside, as hereinafter described.

A is the box; B, the cover, and C the handle. The box and cover are made of tin, as usual. The handle may be made entirely of wire, bent in proper form, as shown in the drawing, or it may be made of wood, having a wire shank for attaching to the box. $a$ is an elongated hole formed in one side of the box, near the bottom, to receive the wire shank of the handle. If desired, two holes may be used instead of one, situated near together, as shown in Fig. 4. $b$ and $b'$ are the two ends of the wire shank. The end $b$ is short and straight, while $b'$ is longer, and is curved to fit the inner rim of the box. When the two ends are inserted in the hole or holes $a$ the end $b$ stands straight inward a little distance, while $b'$ extends around some distance, as shown in Fig. 1, and they are secured in place by soldering, riveting, or otherwise. The ends of the shank may be of different form, and may be made of different lengths, without affecting the result.

By the construction above described the shank can be readily inserted in the hole after being bent to proper form. The long end, $b'$, is first inserted by turning the handle around sidewise. When fully inserted and placed in position against the inside of the rim the turning of the handle around to the square position brings the short end, $b$, in line with the hole, and it passes through readily. Thus, while this peculiar form of the shank allows ready insertion, it is made so that when inserted it fits closely the sides of the box without taking up the interior space, and also to form an extended bearing, which, when soldered, makes a strong and stiff attachment to the box. It is much stronger than where the handle is attached upon the outside of the box. It would be difficult to bend the wires to fit the box after being inserted.

What we claim as new is—

The box A, constructed with the hole or holes $a$ in its side, and the handle C, having its end passing through said hole or holes, and soldered or otherwise fastened on the inside.

In witness whereof we have hereunto signed our names in the presence of two subscribing witnesses.

CHARLES H. MORSE.
MARION SHOLES.

Witnesses:
R. F. OSGOOD,
JACOB SPAHN.